US 8,297,086 B2

(12) United States Patent
Yu et al.

(10) Patent No.: US 8,297,086 B2
(45) Date of Patent: Oct. 30, 2012

(54) LOOP CONNECTOR AND CABLE LOCK USING THE SAME

(75) Inventors: Chang-Chiang Yu, Chung-Ho (TW); Chia-Hung Wang, Chung-Ho (TW)

(73) Assignee: Sinox Co., Ltd, New Taipei (TW)

( * ) Notice: Subject to any disclaimer, the term of this patent is extended or adjusted under 35 U.S.C. 154(b) by 0 days.

(21) Appl. No.: 12/961,588

(22) Filed: Dec. 7, 2010

(65) Prior Publication Data
US 2012/0137741 A1 Jun. 7, 2012

Related U.S. Application Data

(60) Provisional application No. 61/267,104, filed on Dec. 7, 2009.

(51) Int. Cl.
*E05B 73/00* (2006.01)
(52) U.S. Cl. ............. 70/14; 70/18; 70/58; 70/30; 70/49; 70/233
(58) Field of Classification Search ................ 70/14, 18, 70/57.1, 58, 30, 49, 233; 24/115 R, 128
See application file for complete search history.

(56) References Cited

U.S. PATENT DOCUMENTS

| 4,086,795 | A | * | 5/1978 | Foster et al. | 70/49 |
| 5,369,970 | A | * | 12/1994 | Voiculescu et al. | 70/14 |
| 6,609,399 | B1 | | 8/2003 | Daniels, Jr. | |
| 6,629,440 | B1 | * | 10/2003 | Meekma et al. | 70/49 |
| 7,104,093 | B2 | * | 9/2006 | Ling et al. | 70/30 |
| 2005/0092037 | A1 | * | 5/2005 | Meekma et al. | 70/30 |
| 2005/0223756 | A1 | * | 10/2005 | Ling et al. | 70/30 |
| 2005/0262904 | A1 | * | 12/2005 | Ling et al. | 70/49 |
| 2008/0072633 | A1 | * | 3/2008 | Samuel | 70/58 |

* cited by examiner

Primary Examiner — Lloyd Gall
Assistant Examiner — David E Sosnowski

(57) ABSTRACT

A loop connector and a cable lock having the loop connector are provided. The cable lock includes a cable, a lock body, and the loop connector. The lock body has a lock unit and a restricting unit. The lock unit can restrict or release the restricting unit to allow the restricting unit to movably restrict or release the cable. The cable thereby extends or retracts in this manner. The loop connector has a connector body that includes a first through hole and a second through hole. The first through hole and the second through hole are adjacent to each other, wherein the normal direction of the cross section of the first through hole is perpendicular to the normal direction of the cross section of the second through hole. When the cable passing through the lock body passes through the loop connector, the cable forms a plurality of loops at the lock body with the loop connector and the lock body to secure and protect one or more articles from being stolen.

16 Claims, 15 Drawing Sheets

LOOP CONNECTOR AND CABLE LOCK USING THE SAME

BACKGROUND OF THE INVENTION

1. Field of the Invention

The present invention generally relates to a lock structure. Particularly, the present invention relates to a loop connector that forms a loop with a cable and a cable lock using the same.

2. Description of the Prior Art

With the increasing application of locks and the subsequent advancement in lock techniques, locks and their manufacturing methods have adapted in form to satisfy peoples' different lifestyle. In order to prevent theft of mobile appliances such as vehicles that are extensively utilized, locks have been developed to be applicable for mobile outdoor appliances.

The general method of securing indoor valuables or vehicular devices such as bicycles and motorcycles is to secure them to some sort of stationary object, such as a pillar, a pole, or any other fixed equipments. Consequently, a kind of cable lock was developed. The cable lock's cable is flexible and bendable to satisfy securing needs such as winding the cable around a stationary pole. The cable lock may extend or retract the cable according to the user's desire and securely lock desirable items to stationary objects to prevent theft.

However, present cable locks still do not completely satisfy the consumers' demands and as a result, the present inventor proposes the following improvement to the conventional design to accomplish other purposes.

SUMMARY OF THE INVENTION

It is an object of the present invention to provide a loop connector which contributes to forming a loop with a cable, and a cable lock that utilizes the same.

It is another object of the present invention to provide a loop connector and a cable lock using the same to secure an article to prevent theft thereof on a stationary object that has some distance to said article.

It is another object of the present invention to provide a cable lock which has a lock body for accommodating the loop connector.

It is another object of the present invention to provide a cable lock which has a loop connector independent of the lock body.

It is a further object of the present invention to provide a lock structure which can be operated in conjunction with various loop connectors.

The present invention can independently provide a loop connector to be operated in conjunction with a cable. The loop connector includes a connector body having a first through hole and a second through hole. The first through hole and the second through hole are provided adjacent to each other, wherein a normal direction of the cross-section of the first through hole is perpendicular to a normal direction of the cross-section of the second through hole so that the cable can be inserted through the first and second through holes of the loop connector and form a closed loop with the connector body.

In some embodiments, the length of the first through hole of the loop connector is similar to the length of the second through hole, which consequently defines the loop connector as a definite geometrical shape such as an elliptic block, a triangular block, a columnar block, or other shapes and structures. However, in other embodiments, the length of the first through hole may be different from the length of the second through hole, causing the loop connector to form a structure with a particular geometrical shape such as a half cylinder or any other non-specified block shapes.

The present invention further provides a cable lock which includes a cable, a lock body, and a loop connector. The lock body has a lock unit and a restricting unit. The lock unit is able to selectively restrict or release the restricting unit so that the restricting unit may movably restrict the cable from freely extending. The loop connector includes a connector body having a first through hole and a second through hole. The first through hole and the second through hole are provided adjacent to each other, wherein a normal direction of the cross section of the first through hole is perpendicular to a normal direction of the cross section of the second through hole. When the cable passing through the lock body passes through the loop connector, the cable forms a plurality of loops with the lock body and the loop connector to secure and prevent theft to the article.

In one embodiment, the loop connector may be utilized independent of the cable lock. In other embodiments, the loop connector may be utilized in combination with the lock body. In other words, the independent loop connector may be operated in conjunction with other various locks, such as a pad lock or other locks with cables. However, the loop connector which can be combined with the lock body is preferably applied to a cable lock.

DETAILED DESCRIPTION OF THE PREFERRED EMBODIMENT

Figure 1A:
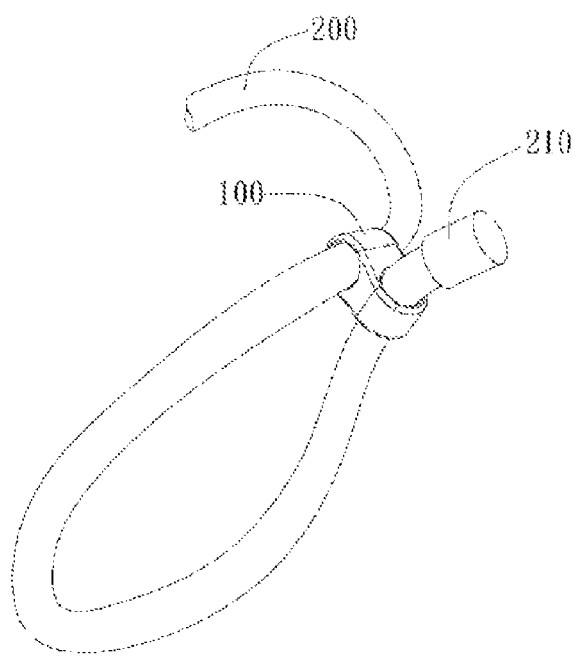
FIG. 1A is a schematic view of the embodiment of the loop connector operated in conjunction with the cable of the present invention.
Figure 1B:
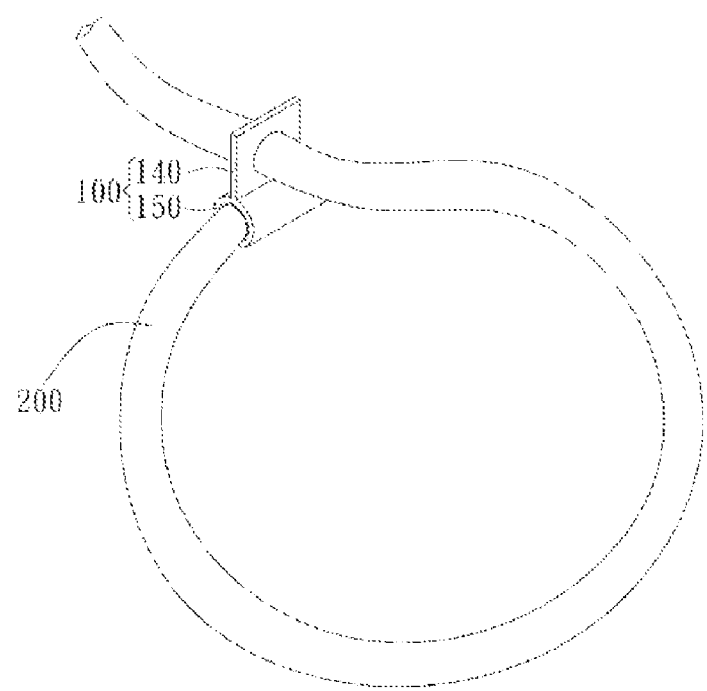
FIG. 1B is a schematic view of another embodiment of the loop connector operated in conjunction with the cable to form a loop of the present invention.
Figure 2A:
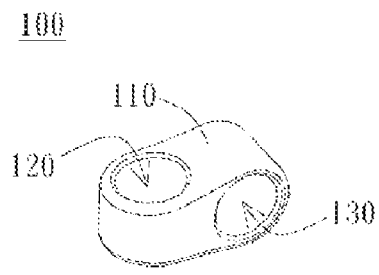
FIG. 2A is a schematic view of the loop connector of the present invention.

As shown in FIG. 1A and FIG. 1B, the present invention provides a loop connector 100 that is operated in conjunction with a cable 200. The cable 200 preferably includes but is not limited to a flexible steel cable, which is clad in a plastic sheath. Referring to both FIGS. 2A and 2B, the loop connector 100 includes a connector body 110, a first through hole 120, and a second through hole 130. The first through hole 120 and the second through hole 130 are provided adjacent to each other on the connector body 110, wherein a normal direction of the cross section of the first through hole 120 is perpendicular to a normal direction of the cross section of the second through hole 130. The first through hole 120 preferably does not communicate with the second through hole 130. In other words, an extending direction the cable 200 passing through the first through hole 120 is perpendicular to an extending direction the cable 200 passing through the second through hole 130. The cable 200 consequently forms a loop with the connector body 110 when passing through both the first through hole 120 and the second through hole 130. As shown in FIGS. 1A and 1B, the cable forms a loop on one side of the loop connector 100 after one end of the cable 200 passes through the first through hole 120 and the other end of the cable 200 passes through the second through hole 130. In the present embodiment, a blocking portion 210 is disposed on an end of the cable 200. The blocking portion 210 has a diameter greater than a diameter of the cable 200 as well as the diameter of the through hole 120, 130 and is made of a hard material to prevent the cable from separating from the loop connector 100.

Figure 2E:
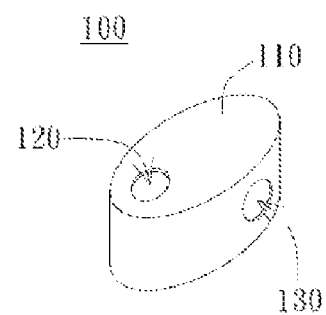
FIGS. 2C-2G are schematic views of various loop connectors of the present invention.
Figure 2B:
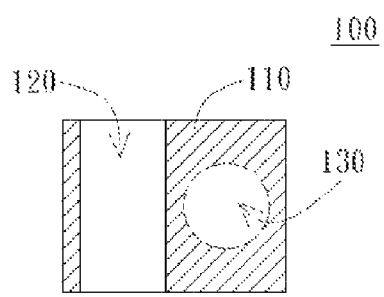
FIG. 2B is a cross-sectional view of FIG. 2A.
Figure 2C:
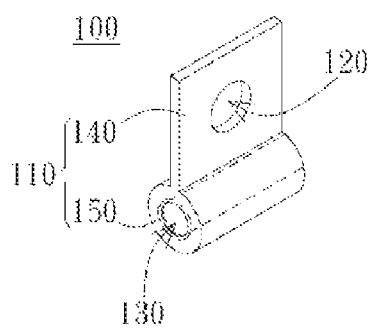
Figure 2F:
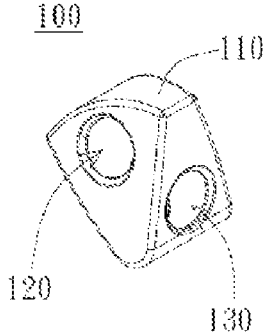
Figure 2D:
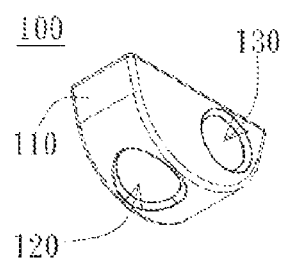
Figure 2G:
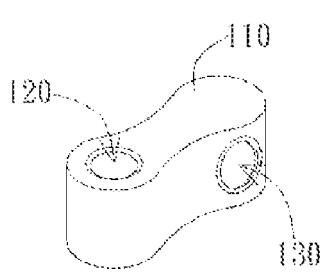

As shown in FIG. 2B, the connector body 110 can be an integral block or a structure consisting of a plurality of portions. For example, a length of the first through hole 120 of the loop connector 100 is similar to a length of the second through hole 130 so that the connector body 110 of the loop connector 100 forms a structure with a definite geometrical shape such as a half cylinder as shown in FIG. 2D, an elliptic block as shown in FIG. 2E, or a triangular block as shown in FIG. 2F. However, as the embodiments shown in FIG. 2C and FIG. 2G illustrate, the length of the first through hole 120 may be different from the length of the second through hole 130 of the loop connector 100 so that the connector body 110 forms a structure with a special geometrical shape such as a cylinder or any other non-specified block shapes. As shown in FIG. 2C, the connector body 110 includes a plate portion 140 and a cylinder portion 150, wherein the plate portion 140 has a side disposed along the axial direction of the cylinder portion 150. That is, the plate portion 140 is disposed erected on a side of the cylinder portion 150. The first through hole 120 and the second through hole 130 are provided on the plate portion 140 and the cylinder portion 150, respectively.

As shown in FIGS. 3A-3D, the present invention further provides a cable lock 300 that has the cable 200, a lock body 310, and the loop connector 100 as described above. In the present embodiment, the loop connector 100 is preferably disposed separately of the lock body 310 of the cable lock 300. The loop connector 100 is not integrated with the lock body 310 of the cable lock 300, but rather is utilized independently in conjunction with the cable lock 300. The individual loop connector 100 can be utilized with various other different cable locks 300, wherein the loop connector 100 includes but is not limited to the type illustrated in the present embodiment. The cable lock 300 described in the present embodiment further includes but is not limited to pad locks or any other locks having cables.

Figure 3A:
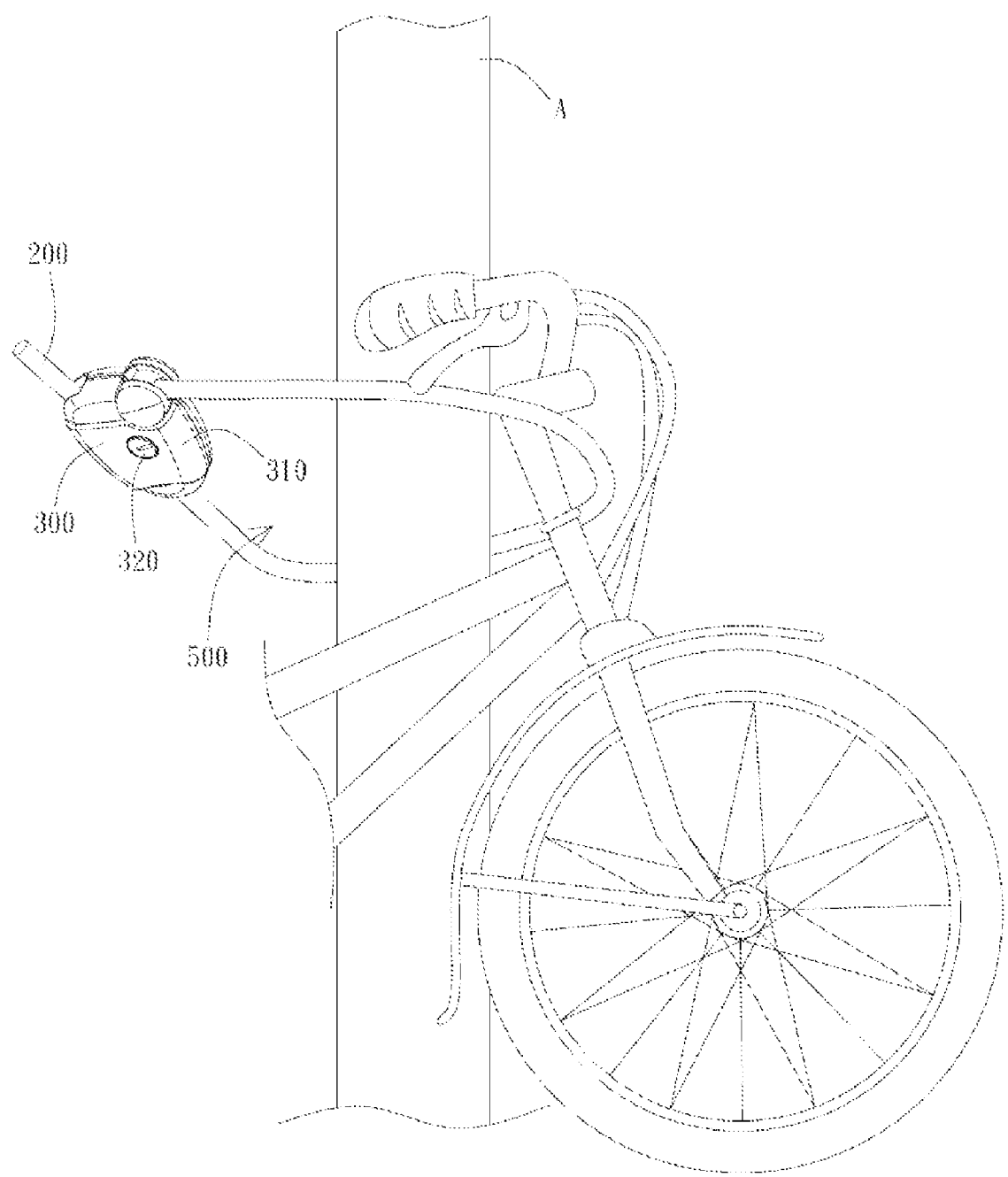
FIG. 3A is a schematic view of the embodiment of the cable lock operated in conjunction with the cable, winding around the fixed object.
Figure 3B:
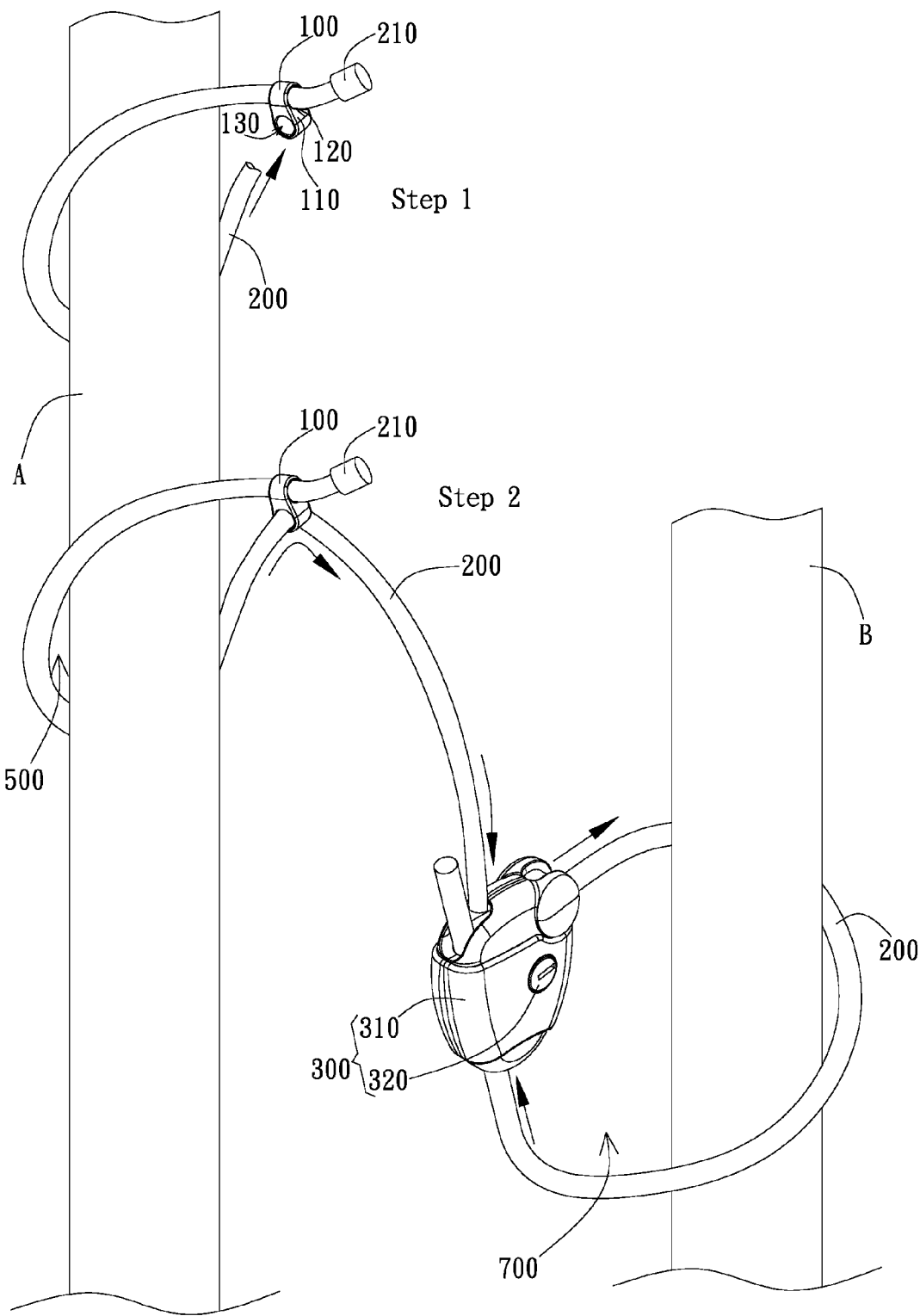
FIG. 3B is a schematic view of another embodiment of the loop connector operated in conjunction with the cable lock of the present invention.

FIG. 3A is a schematic view of the embodiment of the cable lock operated in conjunction with the cable to form a loop to secure an article to a fixed object. In the preferred method of operation, the freely movable cable 200 passing through the lock body 310 of the cable lock 300 can be wound around both an article requiring theft protection (e.g. a bicycle as shown in FIG. 3A) and a fixed object A. The cable 200 then winds back to the lock body 310 to fulfill the operation of securing the article to the fixed object A. In other words, the theft protection operation is fulfilled by restricting the movement of the cable 200 through the lock unit 320 of the cable lock 300. When the distance between the article requiring theft protection and the fixed object is relatively larger, the loop connector 100 may be utilized, as shown in FIG. 3B. In the present embodiment, step 1 involves passing the cable 200 through the first through hole 120 on the end without the blocking portion 210, winding the cable 200 around the fixed object A, and then passing the cable 200 through the second through hole 130 to form a first loop 500. Step 2 involves passing the cable 200 from the second through hole 130 through one side of the lock body 310, winding the cable 200 around a fixed object B, and then finally passing the cable 200 through the other side of the lock body 310 to form a second loop 700. Completing steps 1 and 2 finalizes the theft protection operation of securing the article to the fixed objects A and B.

Figure 3C:
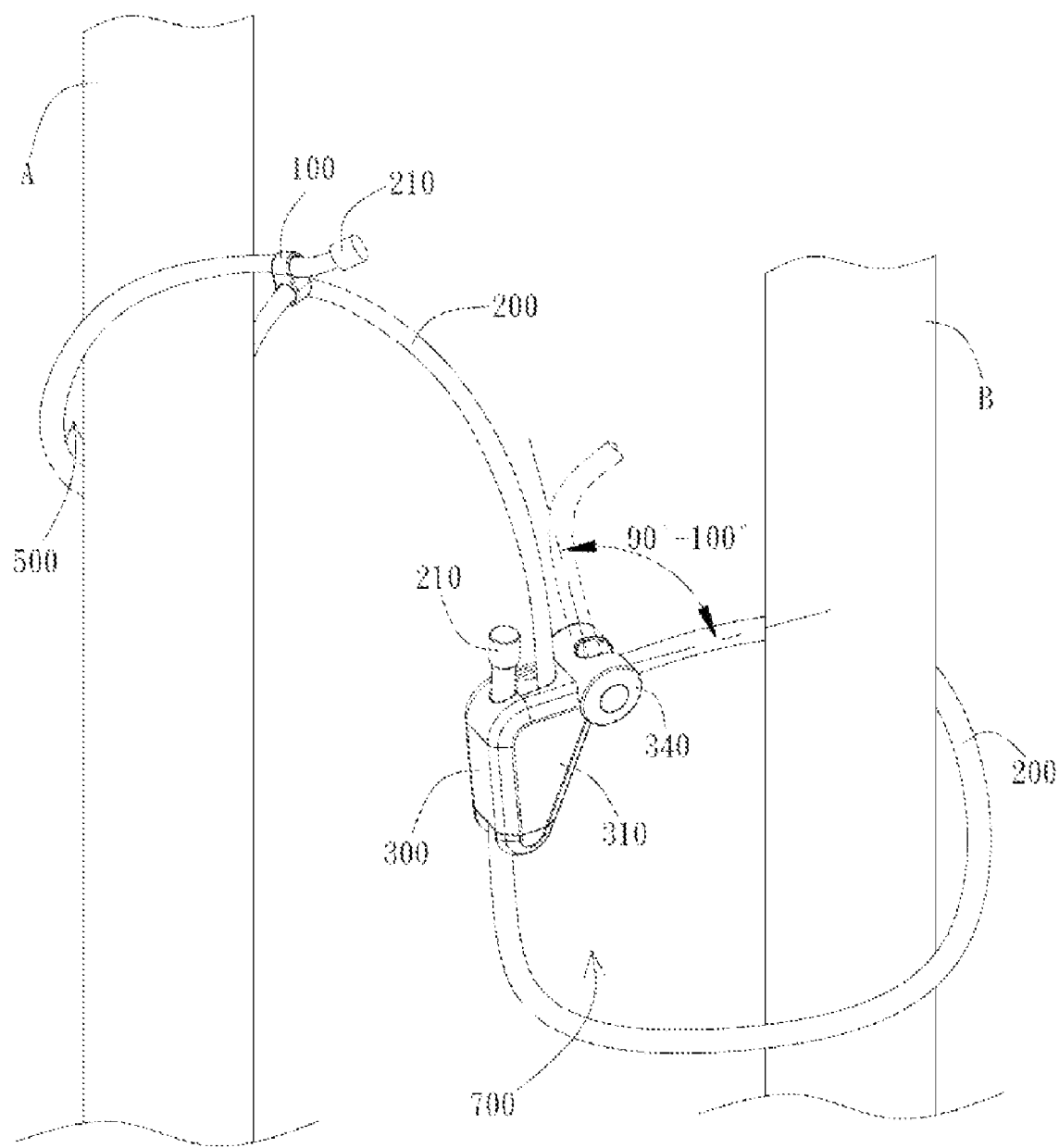
FIG. 3C is a schematic view of an embodiment of the loop connector operated in coordination with another cable lock of the present invention.
Figure 3D:
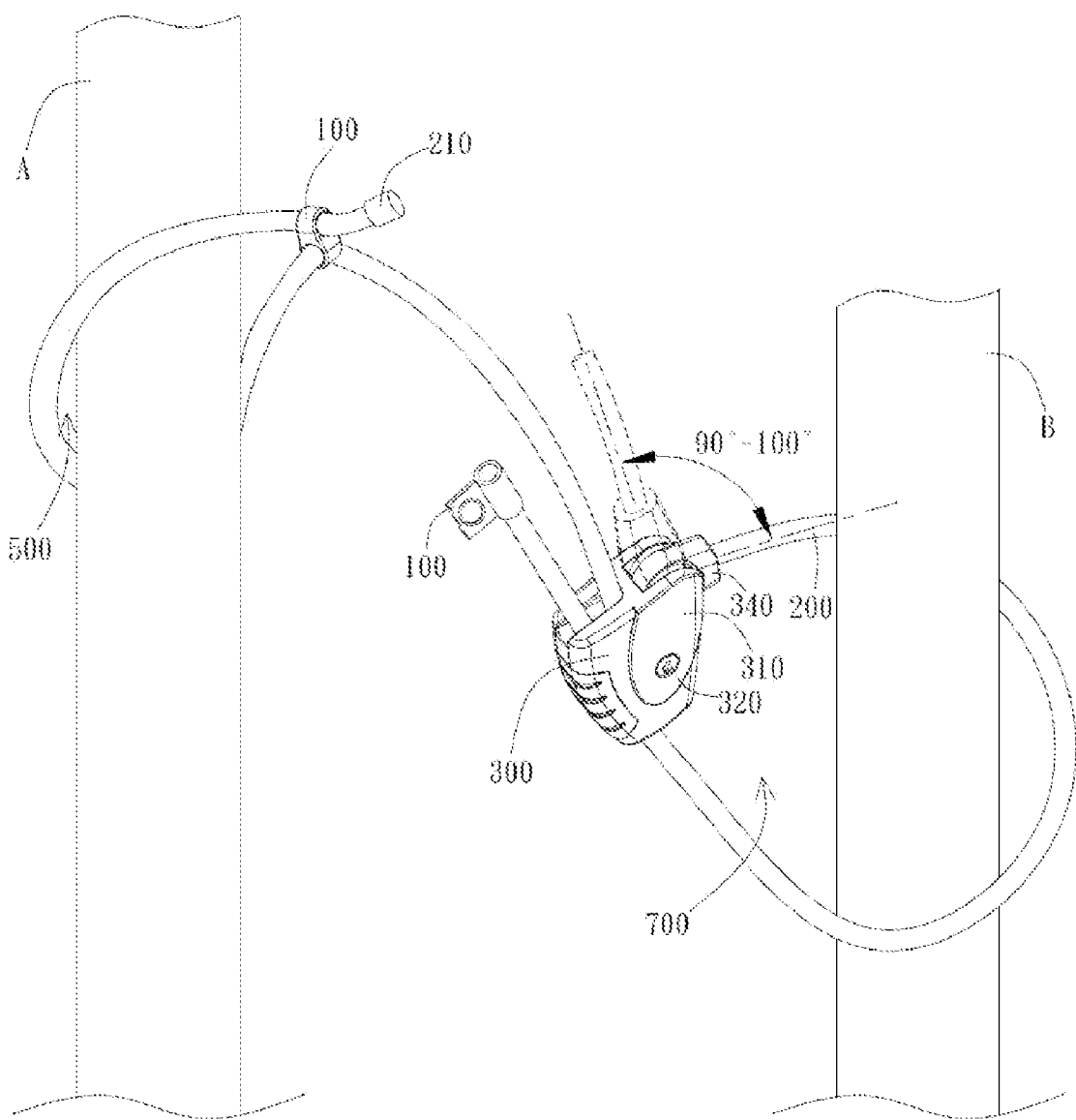
FIG. 3D is a schematic view of the embodiment of the cable lock operated in conjunction with the cable winding around two fixed objects.

The article requiring theft protection can be selectively secured on either the fixed object A or B. The article may also be viewed as one of the fixed object A or B and individually looped around by the cable 200. Moreover, as FIG. 3B illustrates, the end of cable 200 passing out of lock body 310 preferably has nothing disposed on it in order for the convenient and quick removal of the entire lock device from both the article requiring theft protection and the fixed objects A and/or B. In the embodiments illustrated in FIGS. 3C and 3D, a detachable blocking portion 210, or even another loop connector 100, may be disposed on the end of the cable 200 running out of the lock body 310 to further enhance the theft protection. As shown in FIGS. 3C and 3D, the lock body 310 has an angle adjustable structure 340 which can change the exit angle of the cable 200 passing out of lock body 310. For example, the angle adjustable structure 340 can be a rod, a roller, or a shaft to allow the cable 200 to wind around and adjust the extending direction of the cable 200. The range of angle adjusting preferably remains within 90-100 degrees to improve the operation and convenience of the cable lock 300.

Figure 4A:
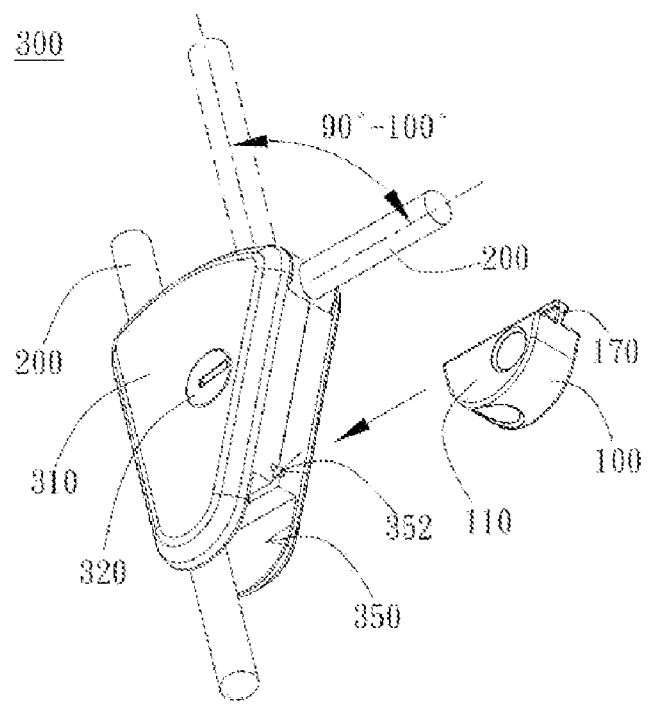
FIG. 4A is a schematic view of the embodiment of the cable lock and the corresponding loop connector that can be combined with the cable lock of the present invention.
Figure 4B:
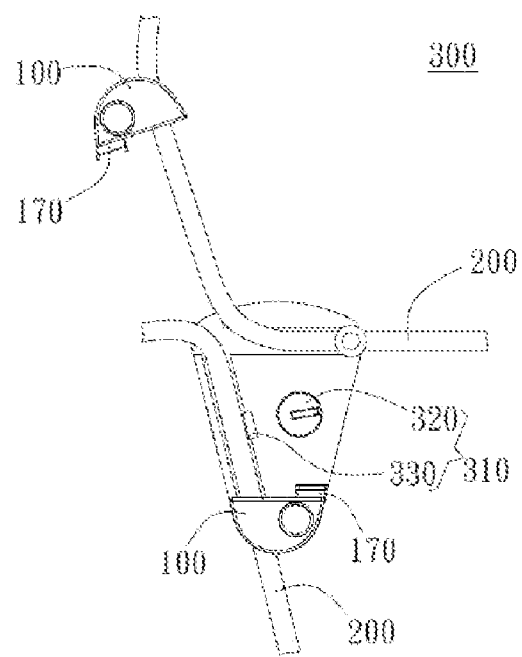
FIG. 4B is a schematic view of the inside of the cable lock shown in FIG. 4A and the corresponding loop connector of the present invention that can be combined with the cable lock.
Figure 4C:
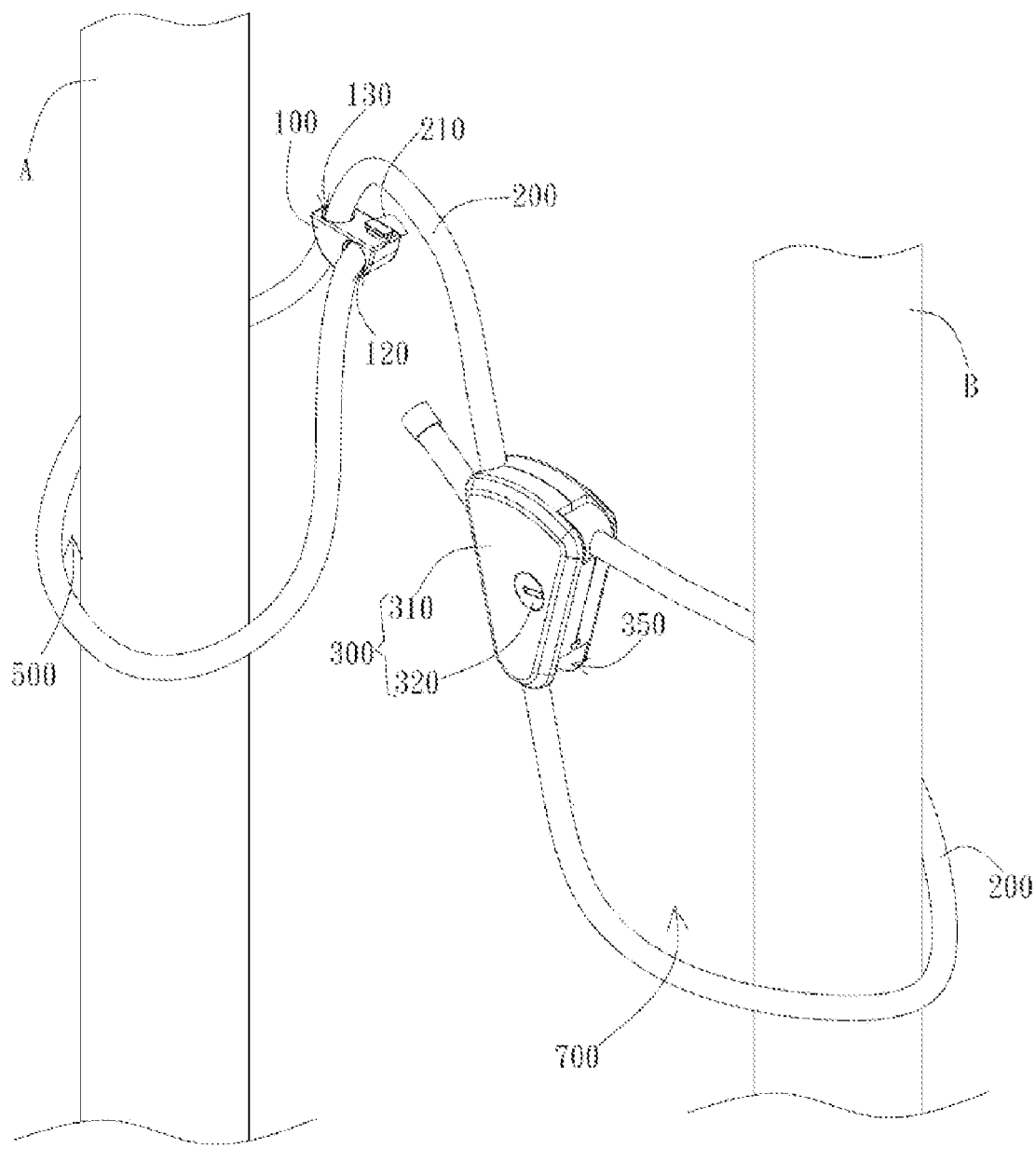
FIG. 4C is a schematic view of the embodiment of the cable lock shown in FIGS. 4A-4B.

As shown in FIGS. 4A-4C, the present invention further provides a loop connector 100 which can be separately combined to the lock body 310 of the cable lock 300. In the present embodiment, the loop connector 100 may be combined with the cable lock 300 by inserting the loop connector 100 in a slot 350 of the lock body 310, wherein an outline of the loop connector 100 and the shape of the corresponding slot 350 are preferably both a half cylinder. A protruding T-shape lodging section 170 is disposed on a side of the connector body 110, with the slot 350 correspondingly forming a T-shape lodging slot 352 where the lodging section 170 may slot in.

FIG. 4B shows an embodiment of the lock unit 320 restricting the length extension of cable 200. The restricting unit 330 is disposed in the lock body 310 on a side of a channel where the cable 200 may pass through. The restricting unit 330 movably restricts or releases the cable 200 to control the length extension of the cable 200. The lock body 330 may include one or more than one restricting units 330. The restricting unit 330 includes but is not limited to a ratchet, a cam, a clamp component, a pressing component, and any other suitable components. The restricting unit 330 preferably has a ratchet with teeth all directed in a single direction. The restricting unit 330 only restricts movement of the cable 200 when the cable 200 moves in a direction opposite to the direction of the teeth of the ratchet. This direction of movement generally extends the length of the cable 200 or expands the loop 700. When the moving direction of the cable 200 coincides with the direction of the ratchet teeth, the restricting unit 330 does not restrict the movement of the cable 200. As a result, this moving direction of the cable 200 generally is a direction that shrinks the loop 700.

The lock unit 320 can selectively restrict or release the restricting unit 330 and typically includes but is not restricted to a baffle plate, a cam, a disc, or any other suitable component. As shown in the embodiment in FIG. 4B, the lock unit 320 is preferably but not limited to a key lock. However, in other embodiments, the lock unit 320 may be a combination lock or a combination of a combination lock and a key lock. Therefore, when the lock unit 320 is in the locked position, the lock unit 320 rotates and restricts the movement of restricting unit 330 in order to restrict the extension movement of the cable 200. In this instance, the cable 200 may only move in a direction that shrinks the loop 700. When the lock unit 320 is in the unlocked position, the lock unit 320 releases the restricting unit 330, allowing the restricting unit 330 to return to its original position to release the cable 200. The cable 200 can then freely move in both directions.

FIG. 4C illustrates a cable lock 300. When using the lock 300, the loop connector 100 and the cable 200 are first detached from the lock body 310. That is, the loop connector 100 is pulled out of the slot 350 together with the cable 200 out of the lock body 310. A free end of the cable 200 without the blocking portion 210 then first passes through the first through hole 120 of the loop connector 100 leaving the other end of the cable with the blocking portion 210 blocked at the first through hole 120. The free end of the cable 200 winds around the fixed object A, and then passes through the second through hole 130 to form the first loop 500. The cable 200 exiting the second through hole 130 then passes through an end of the lock body 310, winds around the fixed object B, and then passes through another end of the lock body 310 to complete the second loop 700. This completes the securing procedure.

Figure 5A:
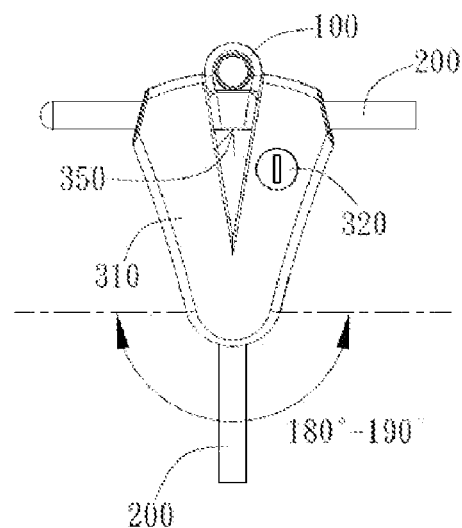
FIG. 5A is a schematic view of another embodiment of the cable lock of the present invention.
Figure 5B:
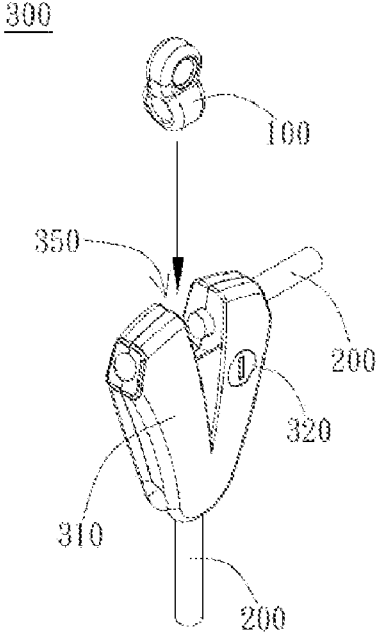
FIG. 5B is an exploded view of the cable lock shown in FIG. 5A and the corresponding independent loop connector.
Figure 5C:
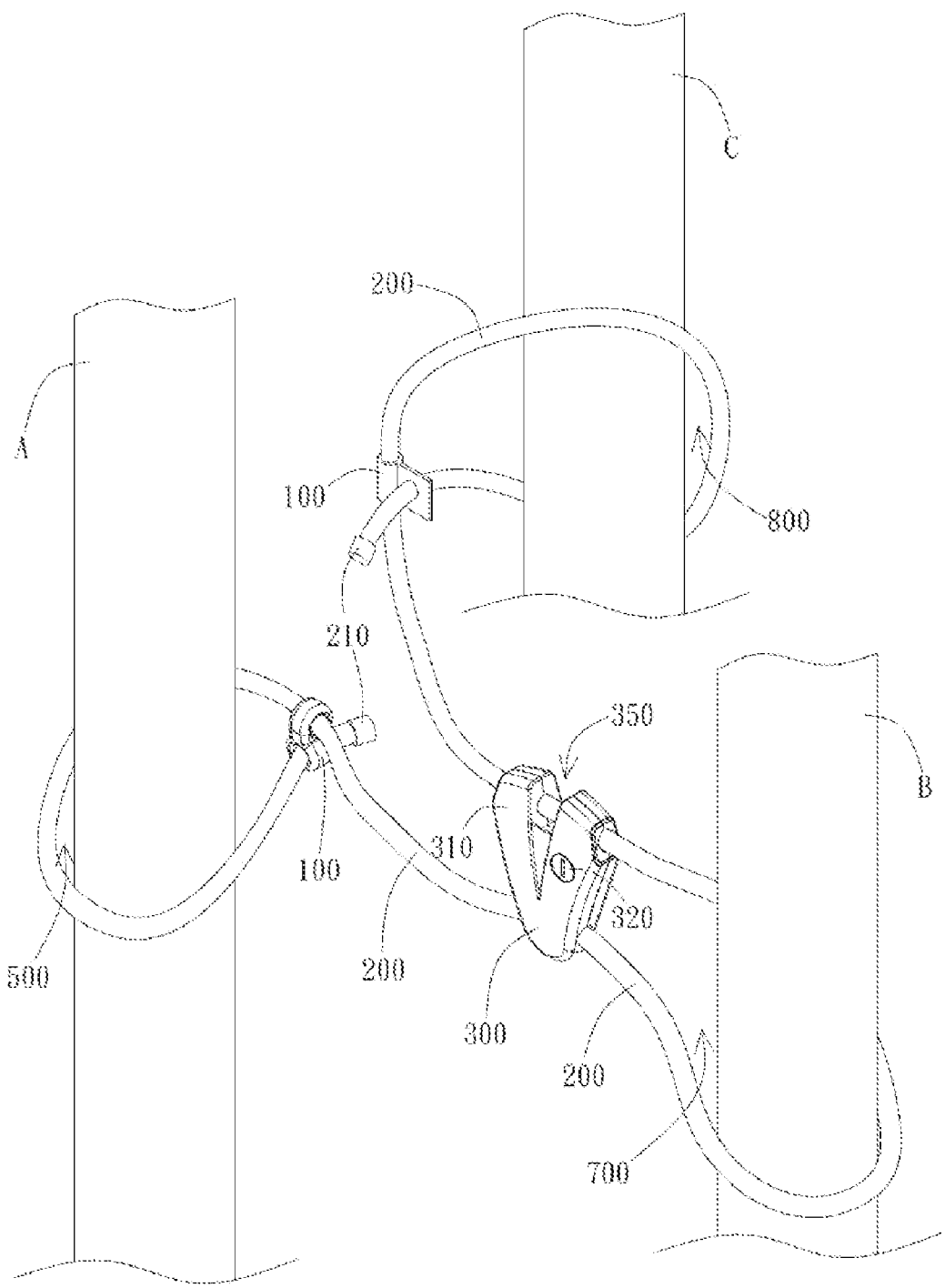
FIG. 5C is a schematic view of the embodiment of the cable lock of FIG. 5B wound around two fixed objects by the cable.
Figure 8A:
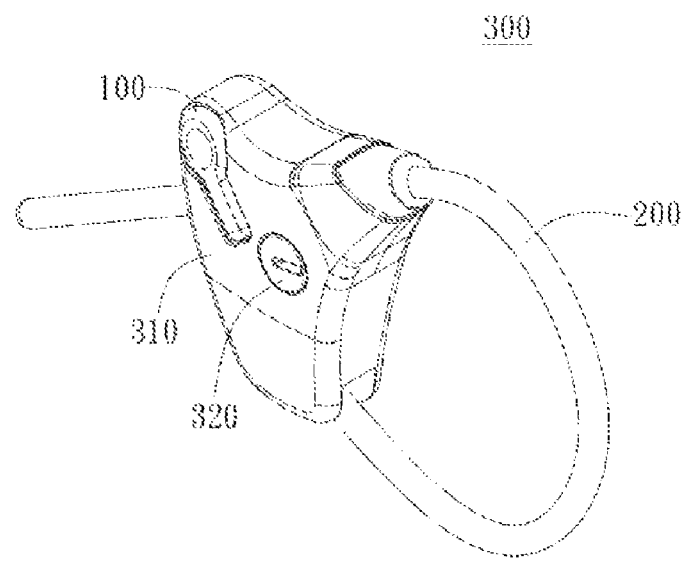
FIG. 8A is a schematic view of another embodiment of the cable lock and the corresponding loop connector that can be combined with the cable lock of the present invention.
Figure 8B:
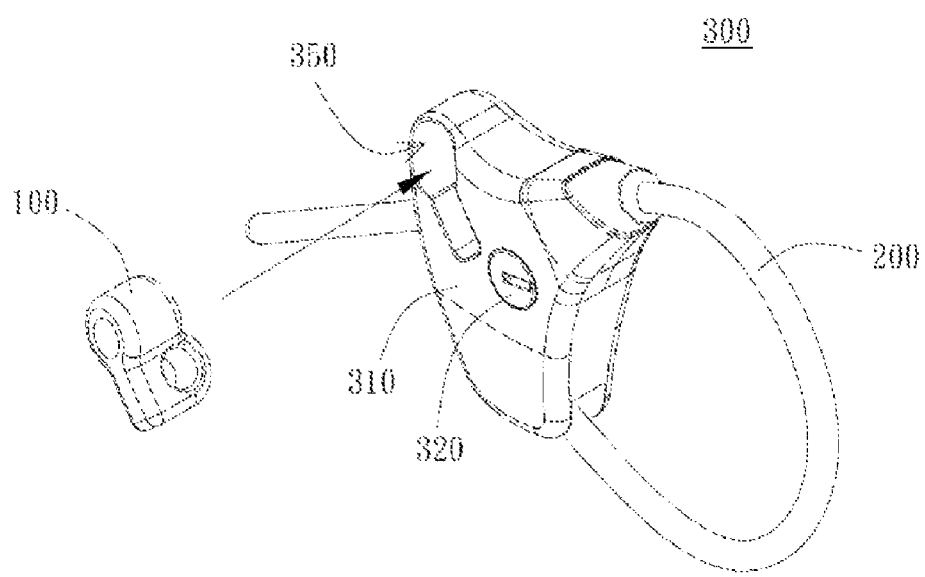
FIG. 8B is a schematic view of the cable lock shown in FIG. 8A and the corresponding independent loop connector.

The following descriptions introduce various other different loop connectors 100 that may be combined with the lock body 310. As shown in FIGS. 5A and 5B, the FIG. 8 shaped loop connector 100 is disposed in the slot 350 of the lock body 310. As shown in the embodiment in FIG. 5A, the bottom of the triangular lock body 310 has enough room for the cable 200 to sway within a range of 180 or 190 degrees to increase the operability and convenience of the cable 200. When the cable lock 300 is not in use, the loop connector 100 can be received in the slot 350 with the cable passing through one of the though holes and two ends of the lock body 310 so that the loop connector 100 can be kept safely with the lock body 310 and the cable 200, eliminating the need of separate storage. FIG. 5C is a view of the embodiment of the cable lock 300 of FIGS. 5A and 5B with the cable winding around a fixed object. As shown in FIG. 5C, in addition to being able to operate the cable lock 300 in the same manner as the embodiment shown in FIG. 4C, the cable 200 exiting out of one side of the lock body 310 is wound around a fixed object C in conjunction with a similar or different type of loop connector 100 to form a third loop 800. A single cable lock 300 can be matched with a plurality of loop connectors 100 according to the different implementation circumstances to secure multiple articles requiring theft protection. It should be noted that the blocking portion 210 disposed on the end of the last loop made by the loop connector 100 should be detachable in order for the cable 200 to pass through the loop connector 100 during disassembly of the cable 200 from the loop connector 100 and the fixed objects A, B, C.

Figure 6A:
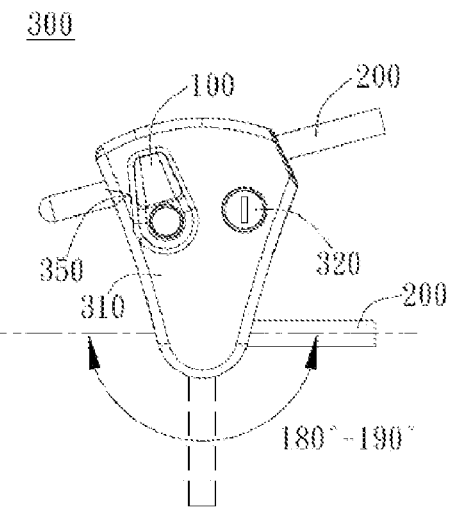
FIG. 6A is a schematic view of another embodiment of the cable lock and the corresponding loop connector that can be combined with the cable lock of the present invention.
Figure 6B:
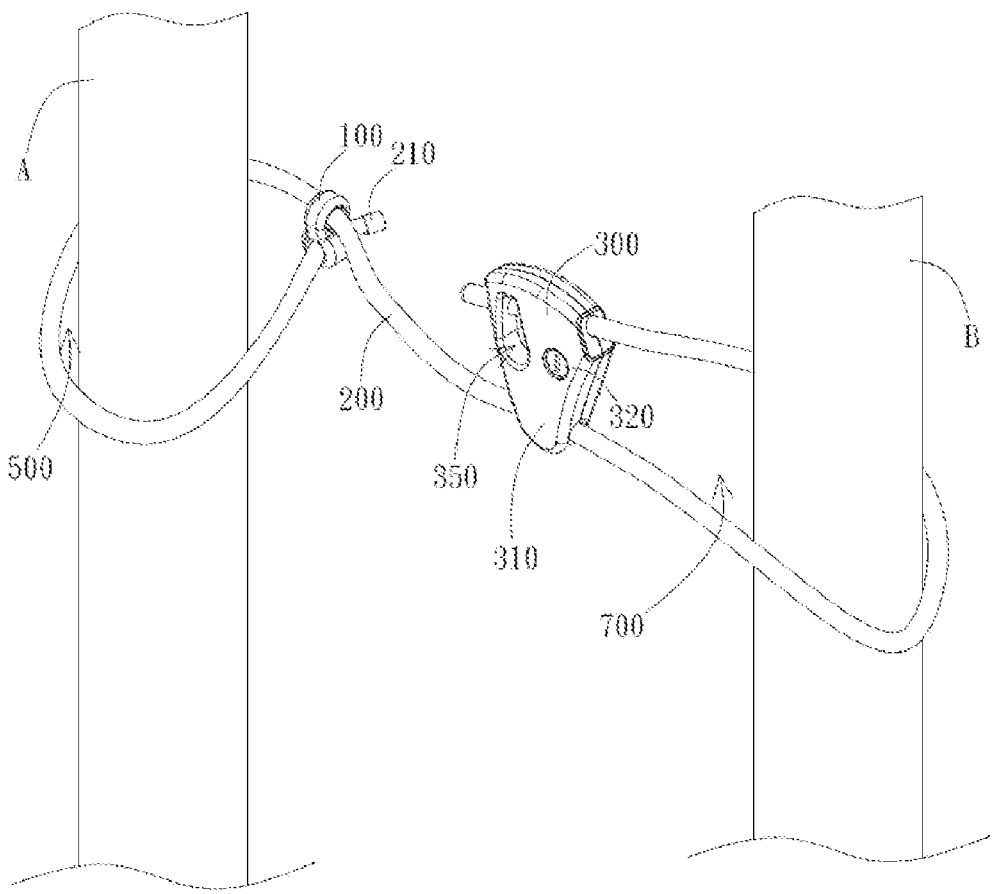
FIG. 6B is a schematic view of the embodiment of the cable lock of FIG. 6A.

FIGS. 6A and 6B show another cable lock 300 which can accommodate the loop connector 100 in the lock body 310. The outline of the loop connector 100 corresponds to the shape of the slot 350 in the lock body 310 so that the loop connector 100 may be accommodated in the slot 350. When the loop connector 100 is accommodated in the slot 350, the cable 200 passes through one through hole of the loop connector 100 to position the loop connector 100 within the lock body 310. When one desires to use the cable lock 300, the cable 200 is first pulled out of the lock body 310 on one end and then the loop connector 100 is pulled out of the slot 350. The cable 200 may then accordingly be separately wound around with the lock body 310 and the loop connector 100 to form the first loop 500 and the second loop 700 as shown in FIG. 6B. Please refer to the embodiment mentioned previously for the detailed operation steps.

Figure 7A:
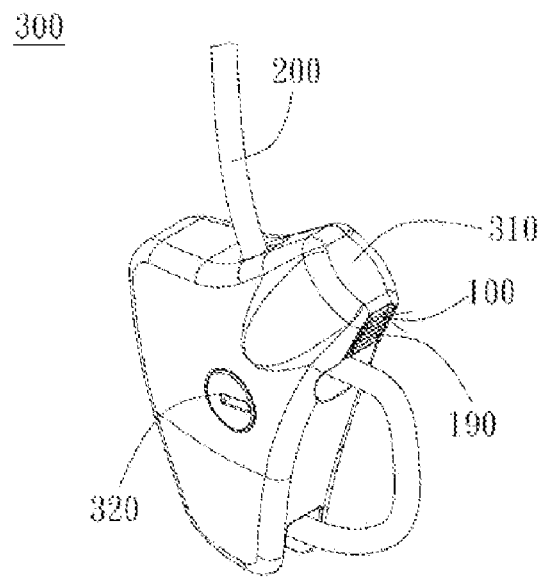
FIG. 7A is a schematic view of another embodiment of the cable lock and the corresponding loop connector that can be combined with the cable lock of the present invention.
Figure 7B:
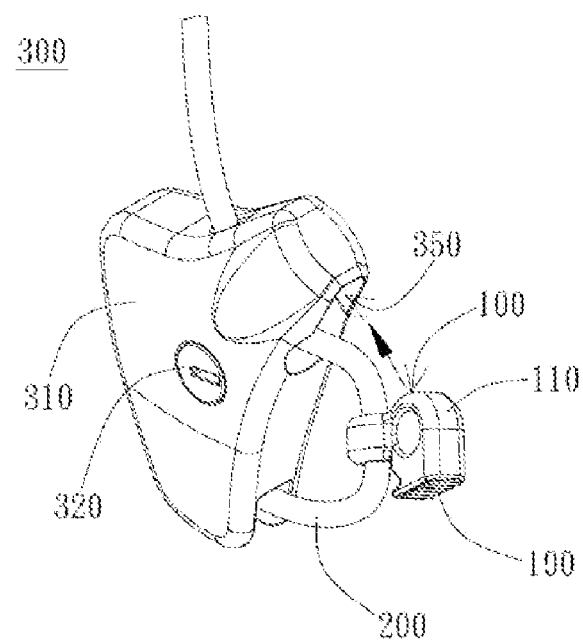
FIG. 7B is a schematic view of the cable lock shown in FIG. 7A and the corresponding independent loop connector.

FIGS. 7A and 7B illustrate another loop connector 100 of non-specific shape, which can be combined with the lock body 310 of the cable lock 300. In the present embodiment, a plurality of protruding bumps on anti-slip portion 190 is disposed on a side of the connector body 110 of the loop connector 100 designed for gripping convenience. The loop connector 100 is preferably disposed in the slot 350 located at a side of the lock body 310, wherein the cable 200 passes through one of the through holes to position the loop connector 100 within the lock body 310. However, in other embodiments, the loop connector 100 and the slot 350 may form a male-female connection matchup to position the components, such as, a groove, a bulge, to prevent the loop connector 100 from falling out the slot 350.

Figure 9A:
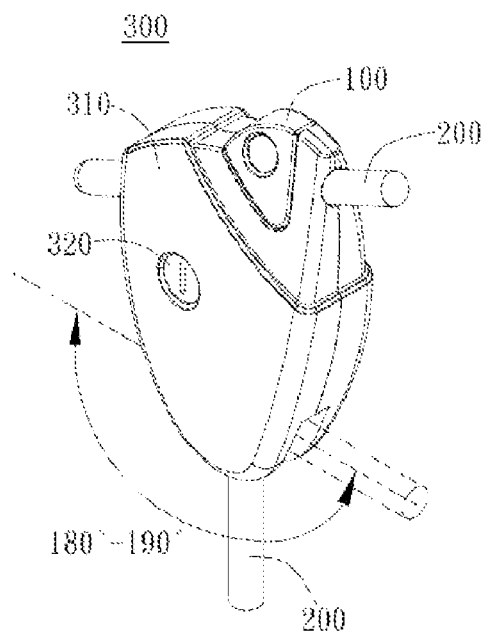
FIG. 9A is a schematic view of another embodiment of the cable lock and the corresponding loop connector that can be combined with the cable lock of the present invention.

FIGS. 8A-8B and 9A-9B illustrate yet another cable lock 300 that accommodates the loop connector 100 within the lock body 310. Moreover, when the loop connector 100 is received in the slot 350 of the lock body 310, the loop connector 100 and the lock body 310 are preferably in an integral shape. For example, the loop connector 100 and the lock body 310 together have a smooth outline or exterior appearance. The loop connector 100 can be categorized in form as having a non-specific shape or having a triangular outline. The different shapes of the loop connector 100 are accommodated separately in the slots 350 with corresponding shapes. Please refer to the embodiment mentioned above for the method of positioning the loop connector 100 within the lock body 310. Moreover, as shown in FIG. 9A, on one end of the lock body 310, the lock body 310 of the cable lock 300 has room for the cable 200 to sway 180-190 degrees in order to improve the operability and convenience of the cable 200.

Figure 9B:
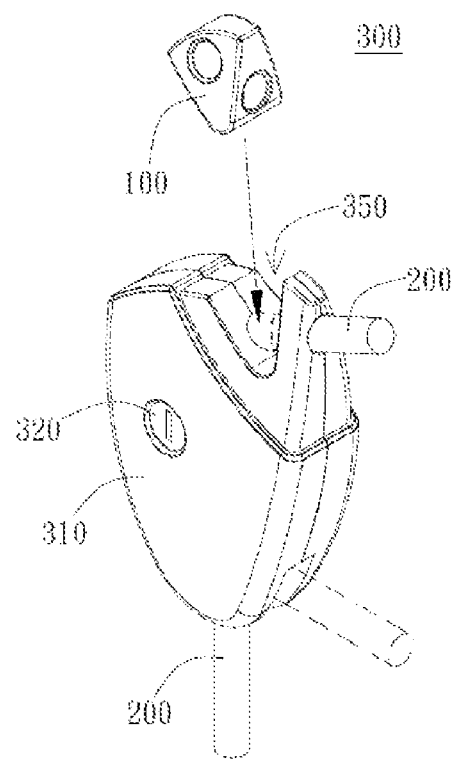
FIG. 9B is an exploded view of the cable lock shown in FIG. 9A and the corresponding independent loop connector that can be combined with the cable lock.
Figure 9C:
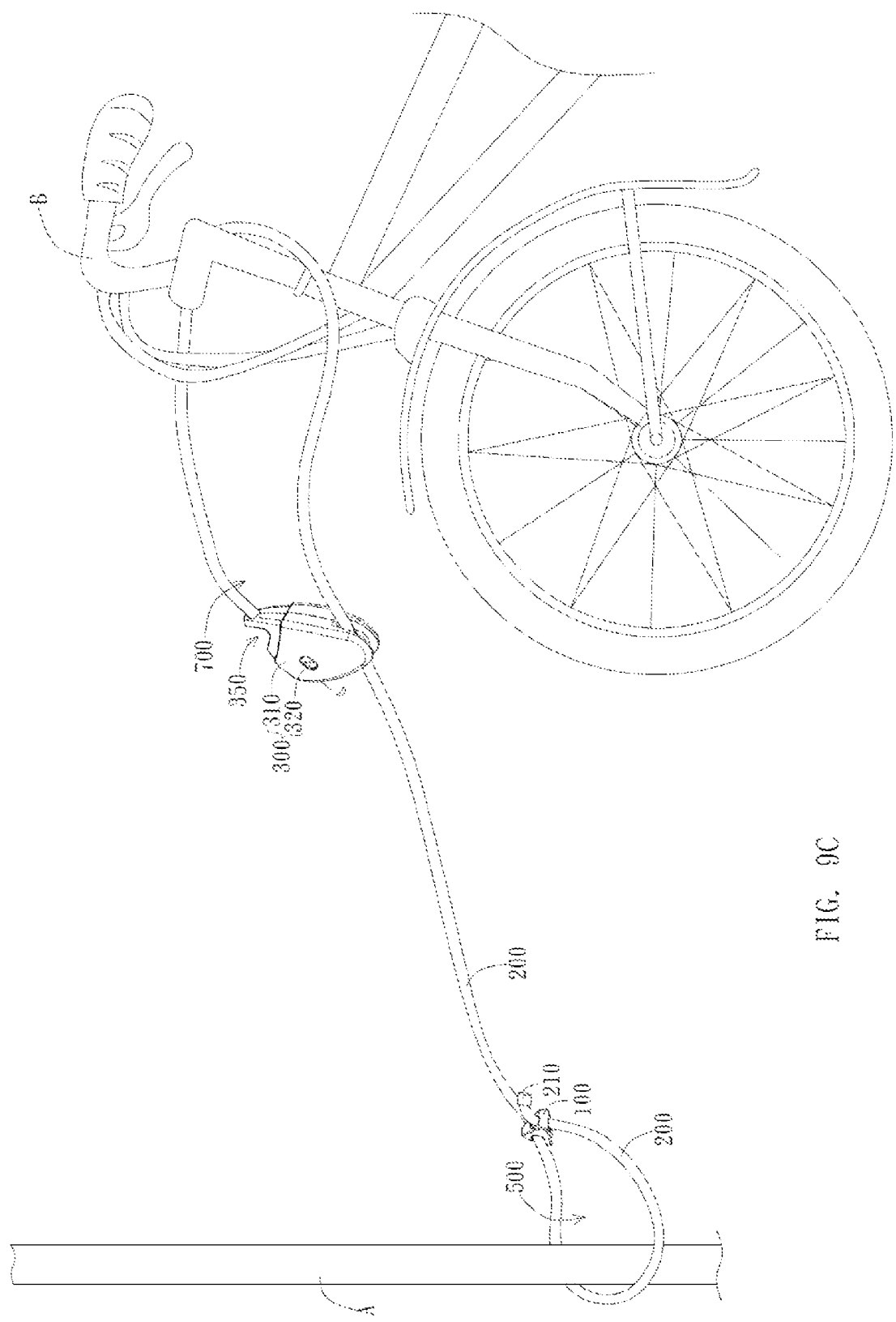
FIG. 9C is a schematic view of the embodiment in practical application.

FIG. 9C illustrates an embodiment applying the cable lock 300 shown in FIGS. 9A and 9B of securing the article requiring theft protection. When the distance between the bicycle B requiring theft protection and the fixed object A is relatively large, the loop connector 100 may be utilized in conjunction with the cable 200 to wind the cable 200 around the fixed object A (to form the first loop 500). The cable lock 300 and the cable 200 are then utilized to wind the cable 200 around the bicycle B to form the second loop 700, securing the bicycle B to the fixed object A to prevent theft thereof. When one wishes to disarm the theft protection legally, the lock unit 320 is unlocked to release the cable 200 so that the cable 200 may freely move. At this time, the cable 200 may separate from the lock body 310, the bicycle B, the loop connector 100, and the fixed object A. The loop connector 100 is then tucked away into the slot 350 of the lock body 310 to complete the disarming process of the lock.

Although the preferred embodiments of present invention have been described herein, the above description is merely illustrative. The preferred embodiments disclosed will not limited the scope of the present invention. Further modification of the invention herein disclosed will occur to those skilled in the respective arts and all such modifications are deemed to be within the scope of the invention as defined by the appended claims.

What is claimed is:

1. A lock for securing an article on a fixed object, comprising:
   a cable;
   a loop connector having a first through hole and a second through hole adjacent to the first through hole; and
   a lock body including a slot for the loop connector to be separably accommodated therein and having a restricting unit and a lock unit for controlling movement of the restricting unit so that the restricting unit restricts or releases movement of the cable;
   wherein the cable passes through the first through hole and the second through hole of the loop connector and the lock body to form a plurality of loops with the loop connector and the lock body, the plurality of loops enclose the fixed object and the article, respectively.

2. The lock of claim 1, further comprising a blocking portion disposed on an end of the cable.

3. The lock of claim 1, wherein the cable passing through the first through hole, winds around one of the fixed object and the article, and passes through the second through hole to form a first loop with the loop connector.

4. The lock of claim 3, wherein the cable passing through the second through hole of the loop connector passes through one side of the lock body, winds the other one of the fixed object and the article, and passes through the other side of the lock body to form a second loop with the lock body.

5. The lock of claim 1, wherein a normal direction of a cross-section of the first through hole is perpendicular to a normal direction of a cross-section of the second through hole.

6. The lock of claim 1, wherein the lock body has an angle adjustable structure allowing the cable to wind around and change an extending direction of the cable.

7. The lock of claim 1, wherein one end of the lock body is provided with a room to allow the cable to sway within a range of 190 degrees.

8. The lock of claim 1, wherein the restricting unit has a ratchet with teeth all directed in a single direction.

9. The lock of claim 8, wherein the restricting unit only restricts movement of the cable when the cable moves in a direction opposite to the direction of the teeth of the ratchet.

10. The lock of claim 1, wherein an outline of the slot corresponds to a shape of the loop connector in a manner that the loop connector and the lock body have an integral shape when the loop connector is received in the slot.

11. The lock of claim 10, wherein the cable passes through one of the first and second through holes of the loop connector to secure the loop connector with the lock body when the loop connector is received in the slot of the lock body.

12. The lock of claim 10, wherein the slot and the loop connector are further engaged with each other through male-female engagement components.

13. A lock for securing an article on a fixed object, comprising:
   a cable;
   a lock body having a slot; and
   a loop connector having a first through hole and a second through hole adjacent to the first through hole;
   wherein the loop connector is selectively received in the slot of the lock body, when the loop connector is separated from the lock body, the cable passes through the first through hole and the second through hole of the loop connector and the lock body to form a plurality of loops with the loop connector and the lock body and secure the article with the fixed object, and
   wherein when the loop connector is received in the slot of the lock body, the cable passes through the lock body and one of the first and second through holes of the loop connector to secure the loop connector with the lock body.

14. The lock of claim 13, wherein a normal direction of a cross-section of the first through hole is perpendicular to a normal direction of a cross-section of the second through hole.

15. The lock of claim 13, wherein the lock body having a restricting unit and a lock unit for controlling movement of the restricting unit so that the restricting unit restricts or releases movement of the cable.

16. A lock for securing an article on a fixed object, comprising:
   a cable;
   a loop connector having a first through hole and a second through hole adjacent to the first through hole; and
   a lock body including a slot for the loop connector to be separably accommodated therein and having a restricting unit and a lock unit for controlling movement of the restricting unit so that the restricting unit restricts or releases movement of the cable;
   wherein the cable forms a plurality of loops with the loop connector and the lock body to secure the article on the fixed object, and the loop connector allows the cable to move in the first through hole or the second through hole to adjust the size of at least one of the loops.

* * * * *